(No Model.)
J. LEDWARD.
SAW.
No. 312,133. Patented Feb. 10, 1885.
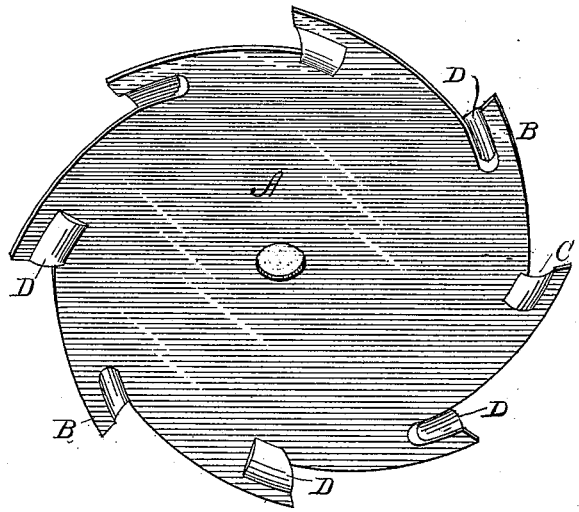
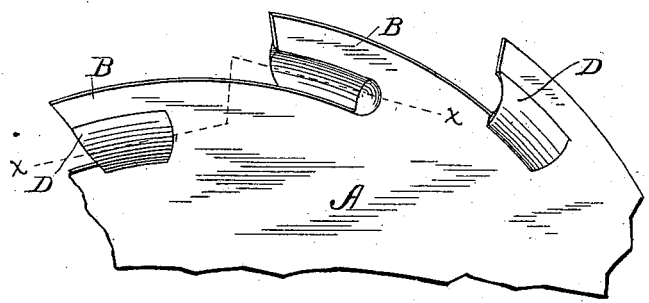
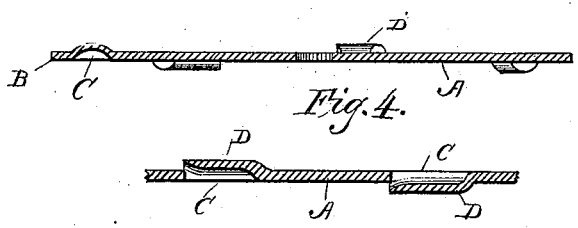
WITNESSES
J. Ledward
INVENTOR
Attorneys

UNITED STATES PATENT OFFICE.

JOSEPH LEDWARD, OF WESTERLY, RHODE ISLAND.

SAW.

SPECIFICATION forming part of Letters Patent No. 312,133, dated February 10, 1885.

Application filed May 28, 1884. (No model.)

*To all whom it may concern:*

Be it known that I, JOSEPH LEDWARD, a citizen of the United States, residing at Westerly, in the county of Washington and State of Rhode Island, have invented a new and useful Improvement in Saws, of which the following is a specification, reference being had to the accompanying drawings.

This invention relates to saws, and is applicable to circular, jig, band, and other saws, and is an improvement on Letters Patent No. 297,816, granted to me April 29, 1884.

The main object of the invention is to adapt the blade of the saw to plane and smooth either one or both of the walls or sides to the slit or opening made by the usual operation of the saw.

The invention further has for its object to provide an improved construction and arrangement of the parts, whereby I attain superior advantages in point of simplicity in construction, and convenience and efficiency in operation.

With these and other objects in view the said invention consists in arranging the planing irons or edges under the teeth of the saw, and alternately on opposite sides of the same, and, further, in leaving out the throats or openings in the saw-blade shown in my aforesaid patent; and the invention consists, further, in certain details of construction and combination of parts, as hereinafter set forth, and particularly pointed out in the claims.

In the accompanying drawings, Figure 1 is a perspective view of a circular saw, showing my improvements applied thereto. Fig. 2 is a detail perspective view of a portion of the saw enlarged, illustrating more clearly the application of my improvement. Fig. 3 is a longitudinal central section through the saw shown in Fig. 1, and Fig. 4 is a transverse section on the line $x\ x$, Fig. 2.

Like letters of reference are used to indicate corresponding parts in the several figures.

Referring to the drawings, A designates a circular saw-blade having the usual teeth B, provided with a slot, C, beneath each tooth, a series of cutting or planing irons or edges, D D, being struck up out of the same piece as the saw, so as to cover the slots, the cutting or planing edges being arranged on one side for one tooth and on the opposite side for the next tooth, and so on in this alternate arrangement for the entire series. The cutting or planing edges D are formed integral with the blade of the saw, and may be struck in shape either a longer or shorter distance, and if found desirable may extend to the center of the blade.

The operation of the invention will be readily understood from the foregoing description taken in connection with the annexed drawings. As the saw-blade works through a board, the cutting-edges in turn and successively will plane and smooth that edge or wall of the split in the board as it is made by the saw. It will be seen that by this construction I am enabled to simplify the construction and produce a better saw, which will act with greater efficiency to plane the edges or side wall of the slit cut through the board by the saw.

This improvement is applicable with equal efficiency to circular, band, jig, and other saws, and the planing or cutting edges may be arranged wholly on one or the other side, or on both, as shown in the drawings.

Having described my invention I claim—

1. A saw-blade having longitudinal slots C cut through the front end of the teeth and extending in the line of direction thereof, and planing-irons formed integral with the blade and covering the slots on either side of the blade, as set forth.

2. A saw-blade having longitudinal slots C cut through the front end of the teeth, and extending in the same line of direction, and curved planing-irons formed integral with the blade and exending from end to end of the slots, so as to cover the same on either side of the blade, as set forth.

3. A saw-blade provided with longitudinal slots C directly under the teeth of the saw, and planing-irons formed integral with the blade and covering the slots, the front edge of the irons being arranged on the same line as the front edge of the teeth, as set forth.

In testimony that I claim the foregoing as my own I have hereto affixed my signature in presence of two witnesses.

JOSEPH LEDWARD.

Witnesses:
EUGENE B. PENDLETON,
DANL. H. CHAMPLIN.